United States Patent [19]

Kuri

[11] Patent Number: 4,464,253

[45] Date of Patent: Aug. 7, 1984

[54] CONTINUOUS FILTER

[75] Inventor: Setuya Kuri, Kamakura, Japan

[73] Assignee: Kuri Chemical Engineers Incorporated, Tokyo, Japan

[21] Appl. No.: 472,845

[22] Filed: Mar. 7, 1983

[30] Foreign Application Priority Data

Mar. 8, 1982 [JP] Japan .................................. 57-35131

[51] Int. Cl.³ .......................................... B01D 21/06
[52] U.S. Cl. .................................. 210/112; 210/147; 210/413; 210/414
[58] Field of Search ............... 210/405, 406, 408, 413, 210/414, 415, 497.01, 153, 357, 396, 97, 103, 108, 109, 111, 112, 147, 222, 223, 113

[56] References Cited

U.S. PATENT DOCUMENTS

| | | | |
|---|---|---|---|
| 2,181,404 | 11/1939 | Koppitz et al. | 210/414 |
| 3,695,173 | 10/1972 | Cox | 210/415 |
| 3,902,962 | 9/1975 | Reinhall | 210/413 |
| 3,943,033 | 3/1976 | Wallén | 210/414 |
| 4,085,050 | 4/1978 | Gervasi | 210/414 |

FOREIGN PATENT DOCUMENTS

| | | | |
|---|---|---|---|
| 151284 | 8/1902 | Fed. Rep. of Germany | 210/415 |
| 252371 | 6/1911 | Fed. Rep. of Germany | 210/415 |
| 2837496 | 3/1979 | Fed. Rep. of Germany | 210/413 |
| 1126882 | 12/1956 | France | 210/415 |
| 118855 | 9/1918 | United Kingdom | 210/415 |

Primary Examiner—Benoit Castel
Assistant Examiner—Wanda L. Millard
Attorney, Agent, or Firm—Sherman & Shalloway

[57] ABSTRACT

Disclosed is a continuous filter comprising a chamber provided with a cylindrical upper portion and a conical lower portion and having at its upper end portion a feed opening for a slurry to be filtered and at its lower end portion a discharge opening for the filtration cake, a porous support disposed inwardly of, and spaced from, the side wall of the chamber, a filter medium provided on the porous support, an outer annular filtrate-collecting space and an inner, slurry- and cake-holding space defined by the porous support, an agitation shaft extending from the slurry feeding end portion to the cake discharge end portion through said slurry- and cake-holding space, and a spiral or vane-like blade on the agitating shaft for shaving the cake on the filter medium and moving it to the discharge end portion of the chamber.

4 Claims, 1 Drawing Figure

CONTINUOUS FILTER

BACKGROUND OF THE INVENTION

1. Field of the Invention

This invention relates to a continuous filter, and more specifically, to a continuous filter in which the amount of a slurry to be treated per unit filtration area is large and the squeezed cake can be discharged continuously.

2. Description of the Prior Art

An Oliver filter, a belt filter, etc. have previously been in widespread use as a continuous filter using a filtration medium such as filter cloth. These filters are of such a structure that slurry is fed on a continuously moving filter medium, and filtered while the slurry is moving on the filter medium, and the resulting filtration cake is scraped off from the filter medium. In this type of continous filter, the degree of pressurization or pressure reduction cannot be made high or in other words, the filtration rate is relatively slow. In addition, with this type of filters, filtration of fine particles is difficult, and in particular, they cannot be used for the filtration of a viscous liquid. Moreover, since these filters are of the open type, the solvent in the slurry is wasted into the atmosphere to pollute the working environment.

The filter press or a Buchner funnel used to be the type for fine particles, a viscous liquid, etc. but, have the defects that the operation is batchwise, and a high treating ability cannot be expected.

In principle, the filtration rate is inversely proportional to the thickness of the filter cake. It is desirable for the filter therefore to minimize the thickness of the cake and perform its filtration continuously instead of batchwise in the closed chamber.

SUMMARY OF THE INVENTION

It is an object of this invention to provide a continuous closed filter in which a filter medium is fixed within the filter, a slurry is filtered while moving over the filter medium, and the cake formed on the filter medium is scraped from the surface of the filter medium so as to form a thin cake layer squeezed by the screw and discharged continuously.

According to this invention, the above object is achieved by a continuous filter comprising a chamber provided with a cylindrical upper portion and a conical lower portion and having at its upper end portion a feed opening for a slurry to be filtered and at its lower end portion a discharge opening for the filtration cake, a porous support disposed inwardly of, and spaced from, the side wall of the chamber, a filter medium provided on the porous support, an outer annular filtrate-collecting space and an inner, slurry- and cake-holding space defined by the porous support, an agitating shaft extending from the slurry feeding end portion to the cake discharge end portion through said slurry- and cake-holding space, and a spiral or vane-like blade on the agitating shaft for shaving the cake on the filter medium and moving it to the discharge end portion of the chamber.

BRIEF DESCRIPTION OF THE ACCOMPANYING DRAWING

FIG. 1 is a side sectional view of the continous filter of the invention.

DETAILED DESCRIPTION OF THE INVENTION

Figure 1:
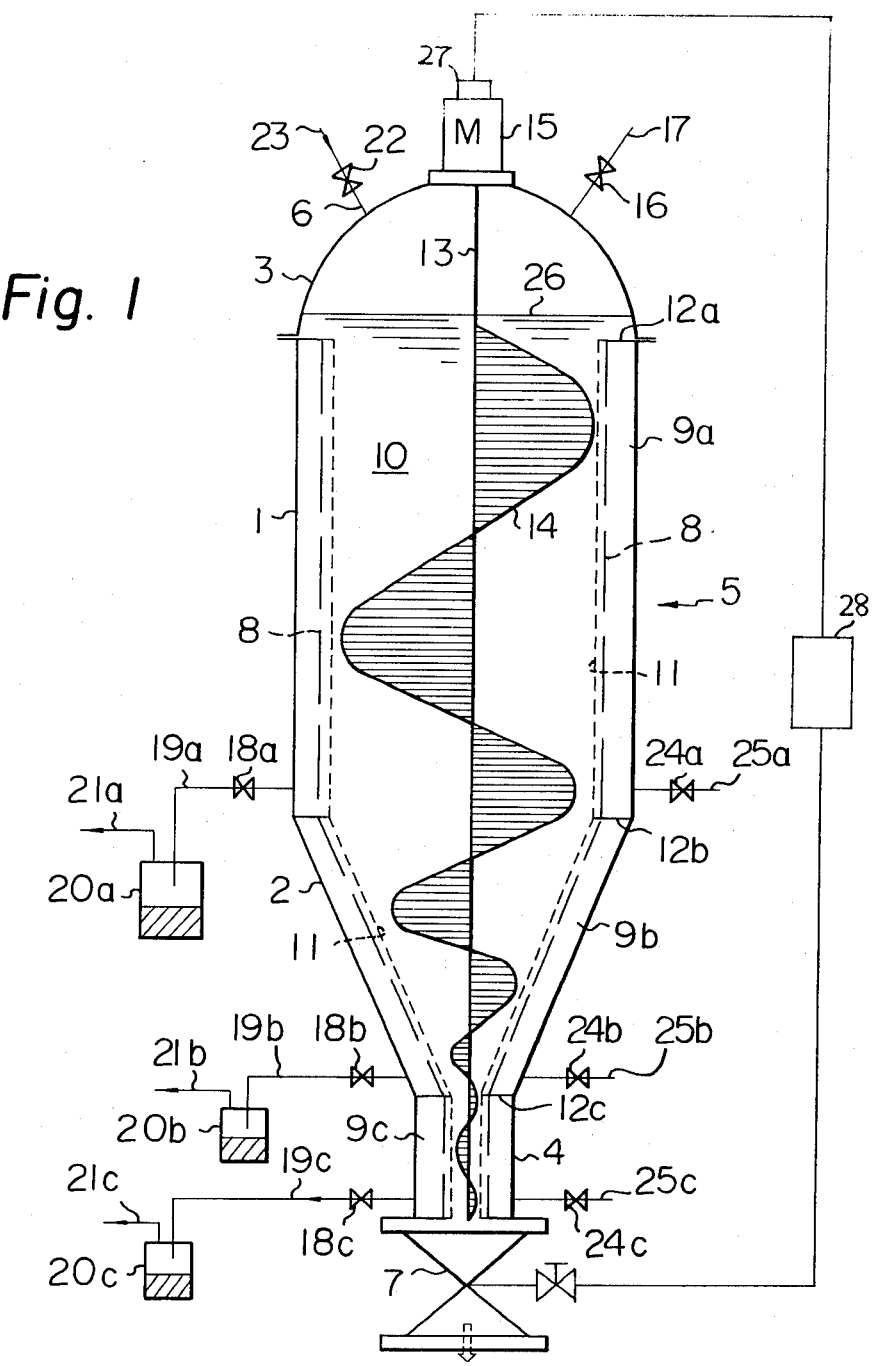

The invention is described below in detail with reference to the specific embodiments shown in the accompanying drawing.

The continuous filter of the invention as a whole is provided with a nearly cylindrical upper portion 1 and a nearly conical lower portion 2. A hemispherical removable closure 3 and a discharge end portion 4 are positioned respectively at the upper end and lower end portion. The above filter of the invention is contained in a closed pressure-resistant chamber 5.

A feed opening 6 for a slurry to be filtered is positioned at the closure 3. Discharge valve 7 such as the ball valve is provided at the lower end of the discharge end portion 4.

Inwardly of the side wall of the chamber 5 a perforated support pipe 8 is provided at a small distance from the side wall, and the space between them is divided to annular spaces 9a, 9b and 9c for collecting the filtrate and an inner space 10 is for holding the slurry and the cake. The perforated support 8 also supports a filter medium 11 inwardly thereof, and the filter medium 11 is provided over the entire surface of the perforated support 8.

Partitioning walls 12a, 12b and 12c are provided in the filtrate-collecting spaces corresponding respectively to the upper portion 1, the conical lower portion 2 and the tubular discharge end portion 4, thereby separating an upper filtrate-collecting space 9a, a lower filtrate-collecting space 9b and a terminal filtrate-collecting space 9c.

An agitating shaft 13 extends from the slurry feeding end portion to the cake discharging end portion 4 through the space 10. A spiral blade 14 for shaving the cake on the filter medium and moving it toward the discharge end portion 4 is fixed to the agitating shaft 13. A driving motor 15 is provided above the closure 3 in order to rotate the agitating shaft 13 and therefore the spiral blade 14. A so-called vane-like or various blade can be used instead of the spiral blade shown in the drawing. But it is preferred to use the spiral or screw-like blade at the cake discharging end portion 4 so as to hard compress and discharge the cake effectively.

There is a fixed clearance between the periphery of the blade 14 and the filter medium 11, and this clearance determines the thickness of the cake layer on the filter medium.

The continuous filter of this invention is operated so that filtration is carried out under elevated pressure, or under a combination of elevated pressure and reduced pressure. The required filtration pressure is given by the pumping pressure for slurry feeding. Filtrate-withdrawing conduits 19a, 19b, and 19c are provided respectively in the filtrate-collecting spaces 9a, 9b and 9c via valves 18a, 18b and 18c in order to withdraw the filtrates stored in these spaces. The conduits 19a, 19b and 19c are respectively led to filtrate reservoirs 20a, 20b and 20c which in turn can be connected to a pressure reducing device such as a vacuum pump by means of pipings 21a, 21b and 21c.

In order to feed a slurry to be filtered into the inside of the chamber 5, a conduit 23 for slurry feeding is connected to the slurry feed opening 6 via a valve 22.

In order to prevent plugging of the filter medium 11 during the long-term continuous operation of the filter, a pressurized gas or solvent is introduced into the filtrate-collecting spaces 9a, 9b and 9c through conduits 25a, 25b and 25c via valves 24a, 24b and 24c, respectively in order to wash back the filter medium 11 and remove solid particles in its screens or pores.

As can be clearly seen from the aforesaid structural characteristics, the continuous filter of this invention is characterized by the fact that the filter medium 11 is fixed, the solid is separated from the liquid while the slurry and the cake shaved from the filter medium are moving downward, the cake is squeezed at the conical section and discharged continuously. Because of these marked characteristics, the continuous filter of this invention can treat a large amount of a slurry in spite of the fact that it has a very small volume and is of a very compact shape. In particular, the filter of the invention can easily filter a viscous liquid, etc. which are difficult to filter in the prior art. Furthermore, since the filter as a whole is a closed pressure-resistant chamber and has a small volume, such operations as pressurization and pressure reduction can be very easily carried out and the cake can be squeezed at the conical section with better efficiency. In addition, the volatilization of the solvent into the working environment can be avoided with the filter of the invention.

In operation, the valve 22 is opened and a slurry to be filtered is fed into the inside of the chamber 5 through the conduit 23 under pressurization by the pumping pressure. The valves 24a, 24b and 24c annexed to the filtrate-collecting spaces 9a, 9b and 9c are closed, and the valves 18a, 18b, 18c are opened. Through the pipings 21a, 21b and 21c, the filtrate-collecting spaces 9a, 9b and 9c are maintained at atmospheric or reduced pressure.

By the pressure difference described above, the filtrate moves to the filtrate-collecting spaces 9a, 9b and 9c through the filter medium 11 and the porous support 8, and a cake layer of solids of the slurry is formed on the filter medium 11. The filtrates from the filtrate-collecting spaces 9a, 9b and 9c are withdrawn respectively through the valves 18a, 18b and 18c. The filtration rate of the cake at each part can be determined from the amount of each filtrate withdrawn. Furthermore, the liquid content of the slurry or cake at each part can be estimated from this amount.

In the present invention, the shaft 13 is rotated by the motor 15, and the blade 14 is rotated along the filter medium 11. By the rotation of the blade 14, a greater portion of the cake layer formed on the filter medium 11 is shaved off, and a thin cake layer having a thickness corresponding to the distance between the blade 14 and the filter medium 11 remains. The resistance of the cake layer becomes a filtration pressure. Hence, the distance between the blade 14 and the filter medium 11 is desirably as small as possible, and preferably in the range of about 1 mm to about 20 mm.

In a filtration process using a general Buchner funnel, as the filtration area cannot be made large, the thickness of the cake is preferred to be as much as on even the order of several tens of centimeters. Hence, a long period of time is required for filtration and the filtration rate is unsatisfactory. When the slurry to be filtered contains fine particles or is a viscous liquid, filtration is very hard for the Buchner funnel, needless to say for other conventional filters.

In contrast, in the filter of the invention, the entire chamber is of a pressure-resistant closed structure, and in the upper portion 1, filtration is carried out at a fixed filtration pressure with the cake layer on the filter medium maintained always at a very small thickness. Accordingly, the filtration rate is high, and even a slurry containing fine particles and a viscous liquid can be filtered with good efficiency by the filter of the invention.

In the continuous filter of this invention, the concentration of the solids in the slurry increases relatively as the slurry moves downwardly from the upper portion. Since the lower portion 2 of the continuous filter of the invention is of the conical shape, the slurry having high solids concentration is produced. At the same time, the slurry of a high concentration is forcibly fed by the spiral blade 14 toward the small-diameter end portion of the lower portion. Hence, in addition to the removal of liquid by the filtration pressure, the removal of liquid or squeezing action of the blade 14 is effected simultaneously. Hence, the removal of liquid to a very high degree becomes possible.

At the lower end of the conical portion 2, the cake is squeezed by the screw and discharged through the section 4, which solvent content can be varied with motor 15 torque.

In the meantime, the filtrates discharged into the filtrate-collecting spaces 9a, 9b and 9c are recovered at the filtrate reservoirs 20a, 20b and 20c through the valves 18a, 18b and 18c and the pipings 19a, 19b and 19c. In the filter of the invention, the filtration resistance to the filter medium 11 becomes progressively higher from the top toward the bottom of the filter. From this viewpoint, it is desirable to make the degree of pressure reduction in the upper filtrate-collecting space 9a lowest, and to increase the degree of pressure reduction at the lower filtration-collecting space 9b, and then the filtrate-collecting space 9c at the discharge end portion.

According to this invention, a slurry containing fine particles or a viscous liquid, which is difficult to filter, can be filtered at a high speed with high efficiency. Moreover, a large amount of the slurry can be filtered with a relatively small filtration area, and a cake having a low liquid content can be automatically and continuously discharged.

When plugging of the filter medium 11 occurs during long-term continuous operation, it is possible to close the valves 18a, 18b and 18c, open the valve 16 and the valve 24a, 24b or 24c, and blow a gas or a solvent into any of the annular spaces 9a, 9b and 9c, thereby removing the particles that plug up the filter medium 11.

In an especially preferred embodiment of the invention, the torque on the motor 15 is detected, and the valve 7 is controlled by this torque. Specifically, the valve 7 is provided as an automatic valve (electromagnetic valve) so as to perform the following operations (A) and (B). (A) The valve 7 is closed when the discharge cake has attained a squeeze ratio lower than a certain value, namely when the torque on the motor has descreased. The squeeze ratio is defined as the ratio by weight of liquid contained in the filtration cake per solid in the filtration cake. For example, when the squeeze ratio is 0.5 it means that the liquid content of the filtration cake is 50%. (B) When the discharge cake has attained a squeeze ratio higher than the above value, namely when the motor torque has exceeded a certain limit, the valve 7 is opened to discharge the cake continuously in a cylindrical form. For this purpose, a torque-detecting mechanism 27 is secured to the motor 15, and on the basis of a signal from the detecting mechanism 27, the opening and closing of the electromagnetic valve 7 are controlled by an automatic control mechanism 28. The motor torque can also be detected by the electric current loaded on the motor.

The following specific examples illustrate the present invention.

A viscous liquid consisting of 35% of toluene, 60% of vegetable oil and 5% of sterol solid particles was continuously filtered by feeding it from the supply opening 6 of a continuous filter having the shape shown in the accompanying drawing and the following specification.

| | |
|---|---|
| Cylindrical upper portion | Height 600 mm |
| | Diameter 204.7 mm |
| Height of the conical lower portion and the discharge end portion | 300 mm |
| Diameter of the discharge end portion | 53 mm |
| Filter medium | 100 mesh stainless steel wire mesh |
| Filtration area | 0.48 m$^2$ |
| Clearance between the spiral blade and the filter medium | 5 mm |
| Agitating speed | 10 rpm |

The above liquid was fed at a flow rate of 600 liters per hour, and the filtration pressure was adjusted to 1 kg/cm$^2$·G. The filtration speed was 20.8 liters/m$^2$/min., and a cake containing about 5% of toluene was obtained at a rate of about 45 kg/hour.

For comparision, 1000 liters of the above liquid was filtered on a Buchner funnel having a diameter of 1000 mm under a filtration pressure of 2 kg/cm$^2$·G using a 100 mesh filter medium. The filtration required a period of about 3 hours (batchwise). The average filtration rate was 5.8 liters/m$^2$/min., and 95 kg of a cake having a toluene content of about 50% was obtained.

The results obtained above show that according to the present invention, a filtration cake having a low liquid content can be continuously obtained at a high filtration rate.

What is claimed is:

1. A continuous filter comprising a chamber provided with a cylindrical upper portion and a conical lower portion and having at its upper end portion a feed opening for a slurry to be filtered and at its lower end portion a discharge opening for the filtration cake, an electromagnetic valve for opening and closing said discharge opening, a porous support disposed inwardly of, and spaced from, the side wall of the chamber, a filter medium provided on the porous support, an outer annular filtrate-collecting space and an inner, slurry-and cake-holding space defined by the porous support, an agitation shaft extending from the slurry feeding end portion to the cake discharge end portion through said slurry-and cake-holding space, a motor for rotating said shaft, a spiral or vane-like blade on the agitating shaft for shaving the cake on the filter medium and moving it to the discharge end portion of the chamber, means for detecting the torque on said motor as a function of the squeeze ratio of said filtration cake at said lower end portion, and means for automatically opening and closing said electromagnetic valve in response to the torque detected by said torque detecting means, whereby when the squeeze ratio is below a preset value, the electromagnetic valve automatically closes the discharge opening and when the squeeze ratio is above said preset value, the electromagnetic valve automatically opens the discharge opening so that the filtration cake can be discharged from said chamber through said discharge opening.

2. The filter of claim 1 wherein a small clearance is provided between the filter medium and the blade.

3. The filter of claim 1 wherein the chamber is a pressure-resistant closed chamber.

4. The filter of claim 1 wherein the slurry is forced by a pump into the chamber through the feed opening.

* * * * *